United States Patent [19]

Sadot

[11] Patent Number: 4,998,251
[45] Date of Patent: Mar. 5, 1991

[54] METHOD OF DETECTING ERASURES AFFECTING A DIGITAL RADIO LINK AND A RECEIVER SYSTEM IMPLEMENTING SUCH A METHOD

[75] Inventor: Philippe Sadot, Paris, France

[73] Assignee: Alcatel N.V., Amsterdam, Netherlands

[21] Appl. No.: 286,439

[22] Filed: Dec. 16, 1988

[30] Foreign Application Priority Data

Dec. 17, 1987 [FR] France ................... 87 17645

[51] Int. Cl.⁵ .............................................. G06F 11/10
[52] U.S. Cl. ........................................ 371/37.1; 371/5.3
[58] Field of Search ............... 371/37.9, 38.1, 39.1, 371/37.1, 37.2, 44, 5.5, 5.4, 5.3, 5.2, 5.1

[56] References Cited

U.S. PATENT DOCUMENTS

| | | | |
|---|---|---|---|
| 3,983,536 | 9/1976 | Telfer | 371/39.1 |
| 4,061,997 | 12/1977 | Niethammer | 371/5.5 |
| 4,261,054 | 4/1981 | Nielsen | 371/5.5 X |
| 4,363,123 | 12/1982 | Grover | 371/5.3 X |
| 4,841,300 | 6/1989 | Yoshida | 371/37.1 X |

OTHER PUBLICATIONS

W. Peterson, "Error-Correcting Codes 2nd Ed", pp. 274–275, 1972.

Primary Examiner—Jerry Smith
Assistant Examiner—Robert W. Beausoliel
Attorney, Agent, or Firm—Christie, Parker & Hale

[57] ABSTRACT

A method of detecting erasures in a digital radio link conveying a signal which is encoded prior to modulation and transmission of the signal by means of an error correcting code having a low covering radius which signal is demodulated and decoded, after which a flag signal is generated whenever the error correcting capacity of said decoding is exceeded, and said capacity-exceeded flag signal is integrated in order to obtain an erasure flag signal.

7 Claims, 3 Drawing Sheets

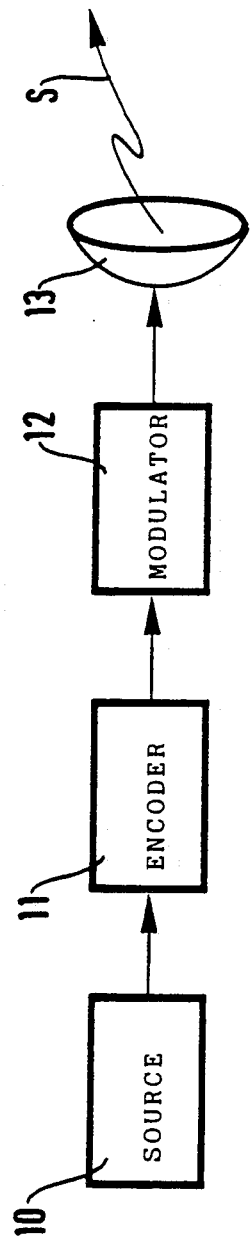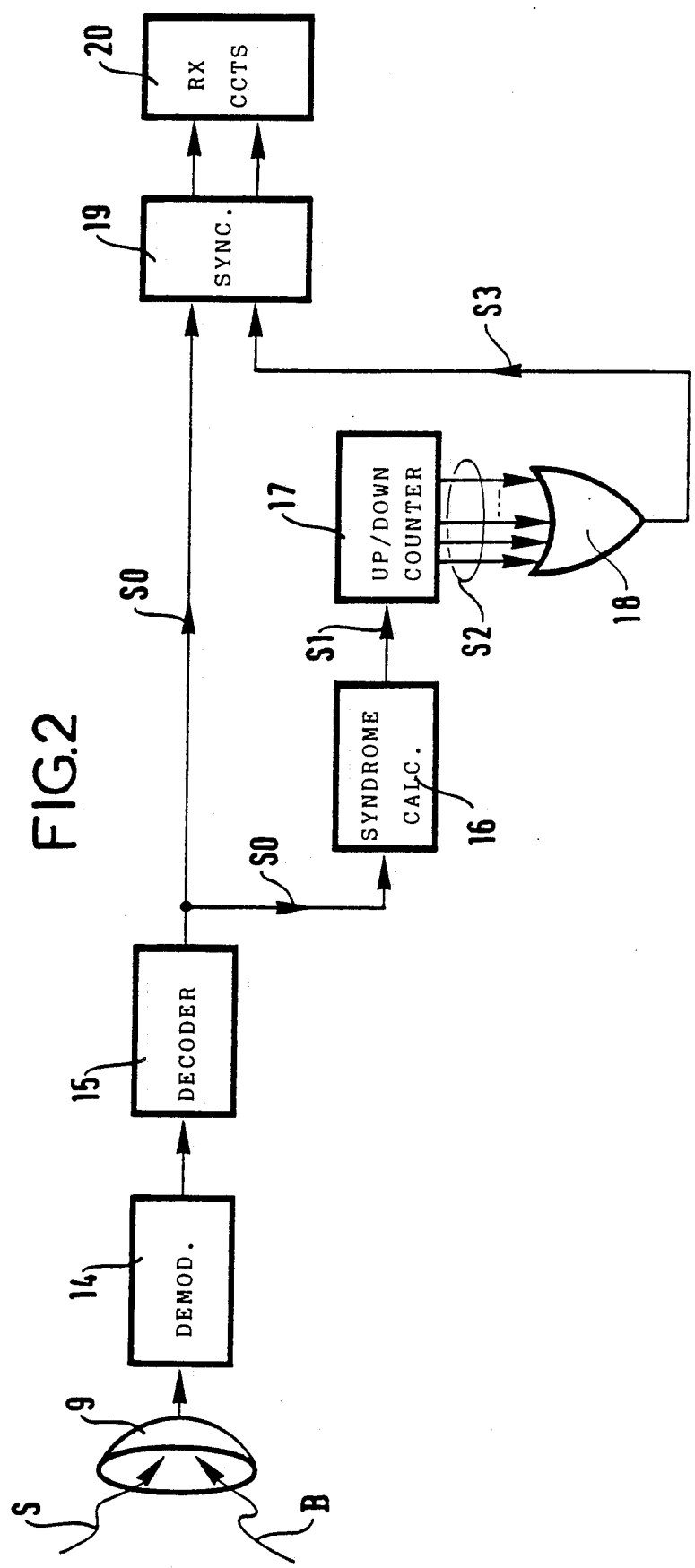

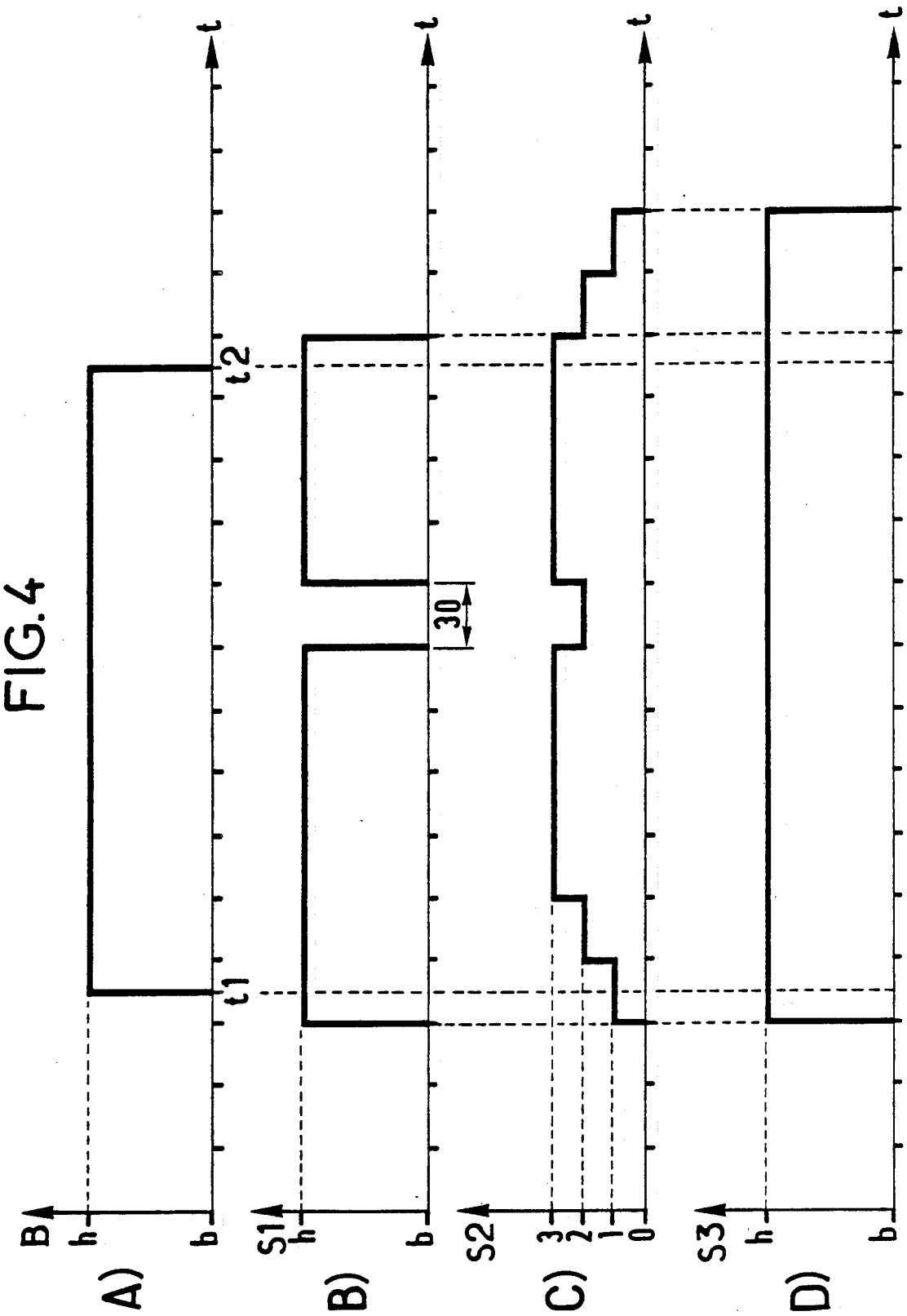

METHOD OF DETECTING ERASURES AFFECTING A DIGITAL RADIO LINK AND A RECEIVER SYSTEM IMPLEMENTING SUCH A METHOD

The present invention relates to a method of detecting erasures affecting a digital radio link and to a receiver system implementing such a method.

The method of the invention makes it possible to correct the interference due to impulse jamming (deliberate or otherwise) affecting radio links by using an error correcting code. More precisely, the invention enables jamming to be detected immediately thus locating those packs of errors in a digital train which are due to jamming.

While jamming is active, links are generally considered as being interrupted which means that the transmitted digital trains appear as packets of errors. In order to withstand such jamming, a particularly effective countermeasure consists in using interlacing and error correcting codes. The performance of the coding system can be further improved if the packets of errors within the digital train can be located: given this information, the decoder works to reconstitute localized erasures rather than to correct random errors. This improves decoder performance.

The problem is thus to be able to locate erasures due to jamming. That is the object of the invention.

Solutions known at present consist in making use of information external to the digital train and available at the receiver: the automatic gain control (AGC) voltage and the level of the "eye" at the outlet from the demodulator prior to regeneration. When jamming is taking place, a very high level of energy is received (in general, the jamming power is greater than that of the useful signal), yet the level of the "eye" is very small since the signal is drowned in the jamming noise. The presence of jamming can be therefore be detected by comparing the level of the AGC voltage and the level of the "eye".

The major drawback of this solution lies in its response time: the AGC voltage is a loop voltage and is subjected to integration, so the presence of jamming is therefore detected after a delay of several milliseconds or even several tens of milliseconds. During this time, the effects of the jamming have not been combatted effectively and packets of incompressible errors therefore remain in the trains.

The object of the invention is to mitigate these drawbacks.

To this end, the present invention provides a method of detecting erasures in a digital radio link covering a signal which is encoded prior to modulation and transmission of the signal by means of an error correcting code having a low covering radius; the method being characterized in that during reception, said signal is demodulated and decoded and a capacity-exceeded flat signal is generated whenever the decoding error correcting capacity is exceeded, and said capacity-exceeded flat signal is integrated in order to obtain an erasure flag signal and in that the code used in a code such that:

the probability of the decoding capacity being exceeded is low;

the probability of error correcting capacity not being exceeded in the presence of jamming is low;

the redundancy of the code is low; and the covering radius of the code is low.

The invention thus consists in detecting jamming by direct examination of the demodulated digital train using an error correcting code having a lower covering radius. The essential advantage of this solution is that it enables jamming to be detected immediately on the appearance of jamming. In addition, this solution is entirely digital, is cheap, and is particularly reliable.

More particularly, in the method of the invention, the capacity-exceeded flag signal is integrated by means of divide-by-q up/down counting.

Since it is possible that the received code word may include so many errors as to come close to a word other than that which was transmitted, the decoder may give rise to a wrong decode.

Advantageously the code used is a BCH code. In order to generate a flag signal indicating that decoding capacity has been exceeded, "syndromes" of the regenerated word are calculated.

In an advantageous embodiment, the (255, 215, 5) BCH code is used with a q being equal to 3, and with the covering radius being $\leq 10^{-2}$.

Advantageously, a receiver system implementing the method of the invention comprises in succession:

a demodulator;

a decoder;

a first circuit for calculating syndromes;

an up/down counter;

an OR gate; and a synchronizing circuit;

with the signal S0 from the decoder also being applied to the synchronizing circuit.

The decoder comprises in succession;

a second circuit for calculating syndromes;

a circuit for calculating an algorithm; and a correction circuit;

the first circuit for calculating syndromes comprising:

a circuit for performing the calculation per se; and a circuit for comparing the syndromes with zero and for delivering a non-zero flag signal unless all of the syndromes are zero.

The characteristics and advantages of the invention also appear from the following description given by way of non-limiting example and with reference to the accompanying figures, in which:

FIG. 1 is a block diagram of a transmitter system implementing the method of the invention;

FIG. 2 is a block diagram of a receiver system implementing the method of the invention;

FIG. 4 shows several signals for illustrating the operation of the method of the invention.

Figure 3:
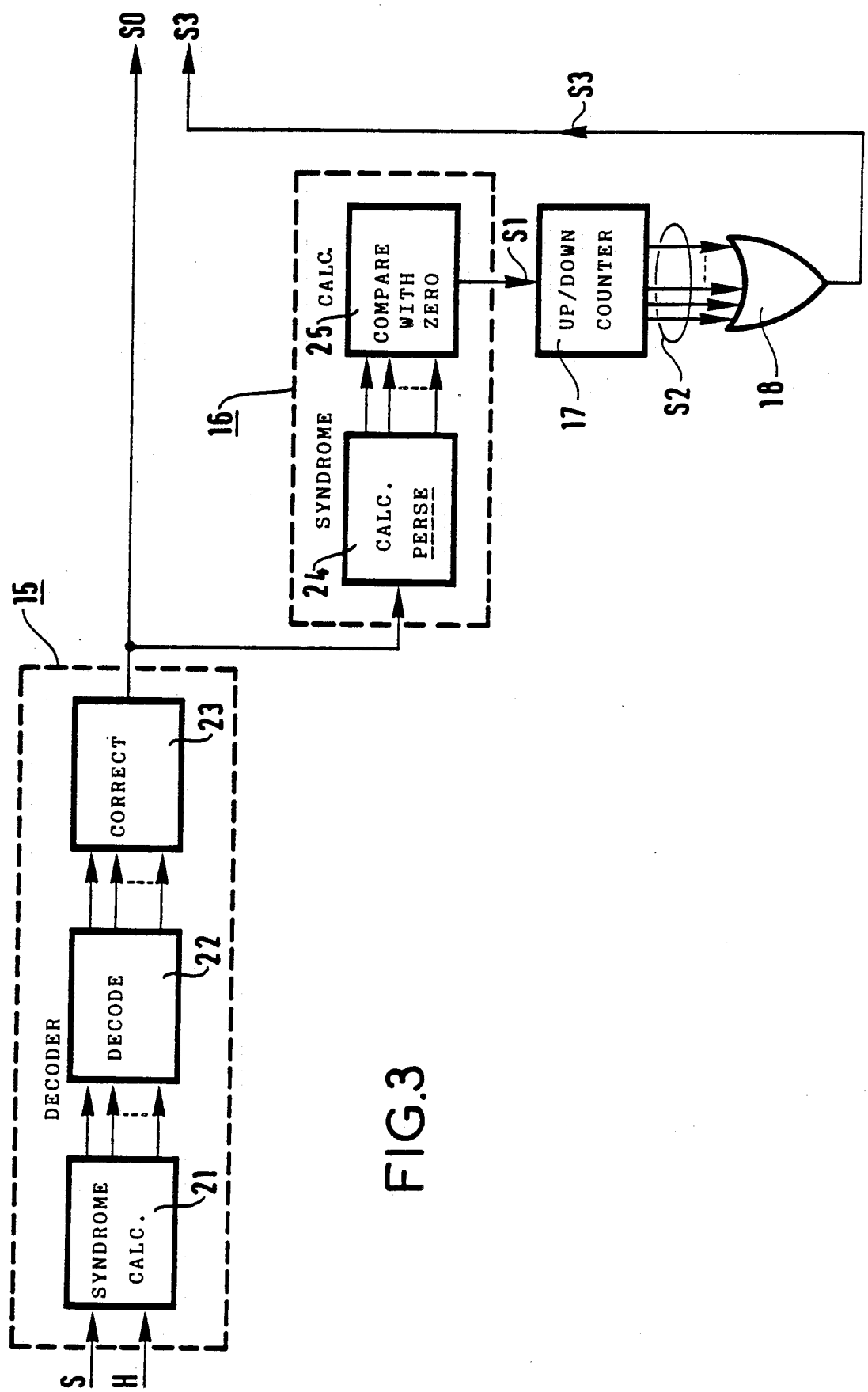
FIG. 3 is a more detailed block diagram of several circuits in the FIG. 2 receiver system.

In the following description, particular attention is given to BCH codes. With such codes, a decoding operation is performed using a conventional algorithm for the code used. After coding and error correction, if any, the regenerated word is tested to verify that it does indeed belong to the code. In a BCH code, use is made of coefficients of the regenerated work called "syndromes", and they are all zero when the word belongs to the code.

A passage in the book by G. C. Clark and J. B. Cain entitled "Error correction coding and digital communications" (published by Plenum Press, New York, pages 188 to 208) relates to an algorithm for decoding BCH (Bose-Chanduri-Hocquenghem) codes, and in particular to calculating the syndromes of the code words.

The simplified transmitter system shown in FIG. 1 comprises, in succession:
- a source 10 of data to be transmitted;
- an encoder 11;
- a modulator 12; and
- an antenna 13 for transmitting the modulated signal S after it has been encoded.

The simplified receiver system shown in FIG. 2 comprises, in succession;
- an antenna 9 for receiving the modulated signal S, possibly together with a signal B transmitted by a jammer;
- a demodulator 14;
- a decoder 15;
- a first circuit 16 for calculating the syndromes of the regenerated word;
- an up/down counter 17;
- an OR gate 18;
- a synchronizing circuit 19; and
- various circuits 20 which are conventional in such a receiver system.

The signal S0 leaving the decoder is also applied directly to the synchronizing circuit 19.

As mentioned above, the decoding operation (15) is performed using the conventional algorithm for the code used. After decoding and error correction (if any) the regenerated word is tested to verify whether it does indeed belong to the code (non-jammed link) or does not belong to the code (jamming is present). This is done by recalculating (16) the "syndromes" of the regenerated word. If all of them are zero, then the word belongs to the code, otherwise a flag signal is generated indicated that capacity has been exceeded.

This signal is applied to a saturating divide-by-q up/down counter 17. The outputs from the counter are applied to an OR gate 18 which generates a logic "1" flag signal whenever the output from the counter 17 is not zero. This flag signal is synchronized with the decoded word and is applied together with the decoded work to the remainder of the receiver system and is used to indicate that erasure has taken place.

The sequence of circuits comprising the decoder 15, the first syndrome calculating circuit 16, the up/down counter 17, and the OR gate 18 are shown in greater detail in FIG. 3.

The decoder 15 comprises, in succession:
- a second circuit 21 for calculating the syndromes;
- a circuit 22 for performing an algorithm, e.g. a Berlekamp algorithm; and
- a correction circuit 23.

The first circuit 16 for calculating the syndromes of the regenerated word comprises:
- a circuit 24 for performing the calculations per se; and
- a circuit 25 for comparing the syndromes with zero and for delivering a non-zero flag signal unless all of the syndromes are indeed zero.

Thus, at the inlet to the decoder there is a signal path S and a clock path H. Each syndrome-calculating circuit 21 and 24 provides t p-bit words. The output from the decoder 15 provides the corrected word and the output from the OR gate provides a flag signal whenever erasure has taken place.

The method of the invention relies on using an internal code having a low covering radius, whose decoding algorithm is capable of detecting whether an attempt at decoding has been successful (errors corrected and a code regenerated) or has failed (the regenerated work does not belong to the code).

Consider an (n, k, t) binary code where:
n=the number of bits per code word;
k=the number of information bits per code word; and
t=the number of errors that can be corrected in the n bits of each word and assuming a normal link unaffected by jamming where the error rate is better than some guaranteed value, e.g. $10^{-5}$. The code parameters (n, k, t) are then selected so that the probability of there being more than t errors in n bits is arbitrarily small. On a normal link, the capacity of the decoder is therefore never exceeded. If the probability of a channel error is written Pe, then the probability that capacity will be exceeded, Pd, is given by $$Pd = 1 - \sum_{j=0}^{t} (n,j) \, Pe^j \cdot (1 - Pe)^{n-j}$$

where (n,j) represents the binomial coefficient: $n!/j!(n-j)!$.

If impulse jamming now occurs, the line error rate goes up considerably while jamming is taking place: the parameters n, k, and t are chosen to ensure that the correction capacity of the decoder is constantly exceeded. Since the algorithm is capable of detecting that its capacity has been exceeded, it provides a saturation flag signal which can be used by the remainder of the receiver system as a flag indicating that erasure has taken place.

The probability Pnd that the capacity of the decoder has not been exceeded should be made arbitrarily small. If Pb is the error rate created by the jamming pulses, then the probability Pnd can be written:

$$Pnd = \sum_{j=0}^{t} (n,j) \, Pb^j \cdot (1 - Pb)^{n-j}$$

Naturally, it may happen that the received word contains so many errors as to bring it close to a word other than the word originally transmitted: under such circumstances the decoder may decode wrongly, i.e. it will correct the wrong errors and generate the wrong code word. It is therefore necessary to use a code having a very low covering radius, such that the probability of such an event occurring is small enough.

The covering radius Rho of a code is the ratio of the number of correctable n-bit words to the total number of possible n-bit words. For a code having parameters (n, k, t) it is written as follows:

$$Rho = 2^{k-n}(1 + (n,1) + (n,2) + \ldots (n,t))$$

This represents the probability that an arbitrary n-bit word constitutes a code element or differs from a code element at not more than t positions.

If Rho is not small enough, it may happen that a jammed word is recognized as being a correctable word, thereby giving rise to a wrong decode. In order to avoid this, the capacity-exceeded flag is integrated, for example by applying it to a divide-by-q counter which saturates at level q. The resulting erasure flag bit is then obtained by a logical OR of all of the outputs from the counter. As a result, the probability of wrong decoding becomes (Rho)$^q$, and a suitable choice of q can make this value sufficiently small.

In order to obtain the best possible operation, a code in accordance with the invention must therefore have the following properties:

(1) It must have a low covering radius Rho:

$$Rho = 2^{k-n}(1+(n,1)+(n,2)+\ldots(n,t))$$

For example, using a (255, 207, 6) BCH mode, Rho is close to $10^{-3}$. This means that in the presence of jamming, one word in a thousand will be taken to be correctly decoded when in fact it has been wrongly decode. At a given level of redundancy, BCH codes have a covering radius which falls off quickly with n. For example the (1023, 943, 8) BCH code has a covering radius of about $10^{-5}$, for a redundancy of 1.08. With such low covering radius codes, the appearance of two wrong decodes in succession is practically impossible.

(2) The capacity of the decoder must not be exceeded when the link is not jammed. Assuming that the line error rate is Pe under normal conditions, the probability Pd of the decoding capacity being exceeded must be arbitrarily small:

$$Pd = 1 - \sum_{j=0}^{t}(n,j)\,Pe^j \cdot (1-Pe)^{n-j} < \text{epsilon}$$

with epsilon = $10^{-6}$, for example.

(3) Whenever jamming is taking place, giving rise to an error rate Pb, the correcting capacity of the code must always be exceeded: putting Pnd = the probability of the capacity not being exceeded in the presence of jamming, $$Pnd = \sum_{j=0}^{t}(n,j)\,Pb^j \cdot (1-Pb)^{n-j} < \text{epsilon}$$

(4) Finally, in order to avoid excessively penalizing the link, it is advantageous for the redundancy r of the code to be low:

$$r = n/k \text{ small (e.g. } r < 1.1)$$

Codes exist which satisfy these conditions. Make the following assumptions, for example:
Pe = $10^{-5}$
Pb = $10^{-2}$
epsilon = $10^{-6}$
A (255, 215, 5) BCH code;
 Pd = $3.10^{-19}$
 Pnd = $3.8\ 10^{-7}$
 Rho = $10^{-2}$
 Counter size: q = 3
 giving (Rho)$^3$ < epsilon = $10^{-6}$
In an implementation of the method of the invention:
signal bit rate = 2.340 Mbits/s (e.g. a microwave link); (255, 215) BCH code;
modulated signal bit rate: 2.340(255/215) = 2.775 Mbits/s;
jamming (B): 5 millisecond pulses.
13875 bits are therefore erased, i.e. 13875/255 = 55 words.
A divide-by-3 counter is used.

FIG. 4 (A, B, C, D) is a diagram showing four signals that appear at various points in the receiver system shown in FIGS. 2 and 3.

The signal B represents the presence (high level h between instant t1 and instant t2) or the absence (low level b) of jamming, in highly diagrammatic manner.

The signal S1 is a flag indicating that error correction capacity has been exceeded (high level h) or no exceeded (low level b).

The signal S2 corresponds to the output from the saturating divide-by-3 counter.

Signal S3 is the flag showing erasure (high level h) or non-erasure (low level b).

In this figure, one unit along the time axis corresponds to one word in the transmitted code.

When jamming is taking place (B), a capacity-exceeded flag S1 is obtained, however if a wrong decode 30 occurs, then the flag S1 will be zero while the jamming B is still present.

The signal S2 is obtained at the output from the divide-by-3 up/down counter 17 and the flag S3 is obtained from the output of the OR gate 18, in which it can be seen that the wrong decode 30 has been corrected.

The synchronizing circuit 19 ensures that the erasure flag is put back into phase with the transmitted multi-bit words.

Naturally, the present invention has been described and shown merely by way of preferred example and its component parts cold be replace by equivalent parts without going beyond the scope of the invention.

It will be possible to use a code other than a BCH code.

I claim:

1. A method of detecting erasures in a digital radio link, said method comprising:
    encoding a signal by means of an error correcting code in which
        the redundancy (r) of the code is less than 1.1, and
        the covering radius (Rho) of the code is less than $10^{-2}$;
    modulating and transmitting the thus encoded signal;
    receiving and demodulating the thus modulated and transmitted signal
    using the error correcting code to decode the thus received and demodulated signal into a sequence of regenerated code words;
    detecting whether each word of the thus decoded sequence is a proper code word belong to the code;
    whenever the most recently regenerated code word does not belong to the code, generating a capacity-exceeded flag signal indicating that the error correcting codes's error correcting capacity has been exceeded and that erasures are present in the digital radio link; and
    integrating the capacity-exceeded flag signal by counting up or down between zero and a predetermined integer (q) greater than 1 to thereby continue to indicate the possible presence of said erasures even if the capacity-exceeded flag signal is temporarily interrupted for the duration of not more than (q) words.

2. A method according to claim 1, wherein
    the probability (Pd) of the decoding capacity being exceeded in the absence of jamming and the probability (Pnd) of error correcting capacity not being exceeded in the presence of jamming are both less than a predetermined numerical value (epsilon), and $(rho)^q < (epsilon) \leq (rho)^{q+1}$.

3. A method according to claim 2, wherein said predetermined numerical value (epsilon) is not more than $10^{-6}$.

4. A method according to claim 3, wherein said code is a BCH code, and said capacity-exceeded flag signal is generated by calculating the syndromes of the regenerated word and the counting step is dependent on the thus-calculated syndromes.

5. A method according to claim 4, wherein the code is a (255, 215, 5) BCH code, and said predetermined integer (q) is equal to 3.

6. A receiver system for detecting erasures in a digital radio link, the receiver system comprising:
   a demodulator;
   a decoder responsive to the demodulated signal output from the demodulator;
   a first syndrome calculating circuit responsive to the output of the decoder;
   an up/down counter responsive to the syndromes calculated by the first circuit for generating a count having a predetermined number of bits;
   an OR gate responsive to the individual bits of the count output by the up-down counter to thereby generated an erasure flag signal whenever the count is not zero; and
   a synchronizing circuit for synchronizing the output of the decoder with the output of the OR gate, wherein
   the redundancy (r) of the code is less than 1.1, and
   the covering radius (Rho) of the code is less than $10^{-2}$.

7. A receiver system according to claim 6, wherein:
   the decoder further comprises
      a second syndrome calculating circuit for calculating syndromes,
      a decoding circuit responsive to the output of the second syndrome calculating circuit, and
      a correction circuit responsive to the output of the decoding circuit; and
   the first syndrome calculating circuit further comprises
      a calculation circuit for calculating a plurality of multi-bit syndrome value, and
      a comparison circuit responsive to said multi-bit syndrome values for outputting a single bit flag signal having a first value if all of the syndrome values are zero and a second value if any of the syndrome bits are non-zero.

* * * * *